United States Patent [19]
Hedges

[11] 3,744,926
[45] July 10, 1973

[54] ROTARY ENGINE

[76] Inventor: Joseph Ross Hedges, P.O. Box 32, Hiawatha, Iowa

[22] Filed: May 22, 1972

[21] Appl. No.: 255,376

[52] U.S. Cl. .................................. 415/92, 60/39.44
[51] Int. Cl. ............................................... F01d 1/00
[58] Field of Search ............................. 415/92, 85; 60/39.44

[56] References Cited
UNITED STATES PATENTS

| | | | |
|---|---|---|---|
| 716,047 | 12/1902 | Ingham | 415/92 |
| 1,068,596 | 7/1913 | Long | 415/92 |
| 2,786,647 | 3/1957 | Romero | 415/92 |

*Primary Examiner*—C. J. Husar
*Attorney*—Haven E. Simmons, James C. Nemmers et al.

[57] ABSTRACT

A rotary engine or turbine which uses a pressurized gas to drive a rotor and thereby produce rotary motion. The turbine has a solid cylindrical shaped rotor containing a multiplicity of flutes formed around its periphery. It also has a unique porting arrangement which uniformly directs the gas onto the flutes through multiple inlet ports that are aligned with corresponding exhaust ports thereby utilizing the energy of the pressurized gas to the maximum extent.

11 Claims, 3 Drawing Figures

Patented July 10, 1973

ROTARY ENGINE

BACKGROUND OF THE INVENTION

There have been developed numerous designs of both internal combustion engines and turbines of a variety of types. Primarily because of its adverse effects on the environment, the internal conbustion engine, particularly the reciprocating piston engine, is falling into disfavor. Although the turbine engine appears to have some advantages over the internal combustion engine as far as its effect on the environment, there has not been developed turbines which are of a practical design, low in cost and which can be used in low horsepower requirement applications.

There is also a considerable amount of controversy and growing concern about large, central, power generating stations because of their large consumption of fossil fuels the supply of which is not inexhaustable. Also, the burning of fossil fuel creates air pollution problems particularly in the quantities used by these large power plants. Some of these large plants are being replaced or supplemented with power generating stations which utilize nuclear reactors as a source of power. However, these also are somewhat controversial because of their undetermined long range effect on the environment. It is not inconceivable that someday power can be generated by individual generating plants at each location where the power is desired. Such an approach would not only eliminate the need for the large central power generating plants but it would also minimize the problems of power distribution. The use of independent individual generating plants also has many aesthetic advantages, such as the elimination of power transmission lines, but to date this approach has not been practical because of the unavailability of suitable power plants for each individual installation. If a small power generating unit were available which had little or no effect on the environment, and if such a generating plant could be provided at a reasonable cost, there would be many advantages to using such plants.

Also, with the number of vehicles presently being used in the world all of which utilize internal combustion engines, the air pollution problems are approaching a critical point. There is, therefore, a need for a relatively small horsepower unit which could be used in vehicles without the adverse effects on the environment that present day internal combustion engines create.

SUMMARY OF THE INVENTION

My invention provides a small power unit of the rotary engine or turbine type which utilizes pressurized gas to drive a rotor and thereby produce power in the form of rotary motion which can then be used to power a vehicle, an electrical generator, etc. The turbine of the invention utilizes a solid cylindrical shaped rotor which has formed around its periphery a plurality of flutes against which the pressurized gas is directed to produce the rotary motion. The turbine is comprised of relatively few easily machined parts which when properly assembled provide a unique porting arrangement that allows the pressurized gas to be introduced through a single port and uniformly distributed across the face of the rotor and against the flutes to produce the rotary motion. Also, the inlet and exhaust ports are uniquely designed so as to be in alignment thereby allowing the gas to travel in a direction that produces the maximum amount of torque for the energy supplied. Because of the way in which the turbine is constructed utilizing a plurality of annular shaped parts that are concentrically arranged within a housing surrounding the rotor, the device is easy to manufacture and easy to service and maintain. In small horsepower applications, the turbine is a very efficient power plant which can be manufactured at a relatively low cost.

DESCRIPTION OF THE PREFERRED EMBODIMENT OF THE INVENTION

Figure 1:
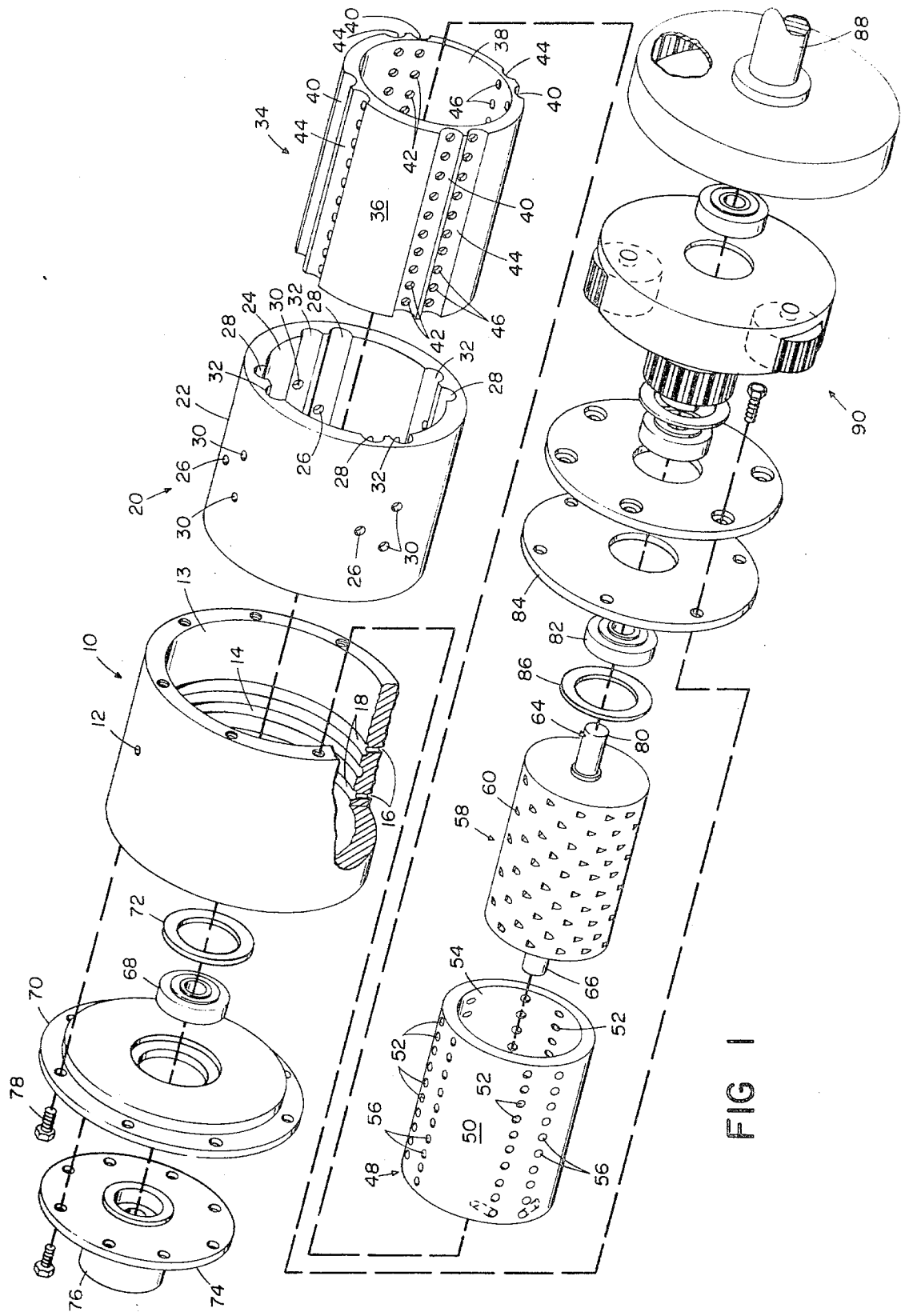
FIG. 1 is an exploded perspective view of a rotary motor constructed according to the principles of the invention.
Figure 2:
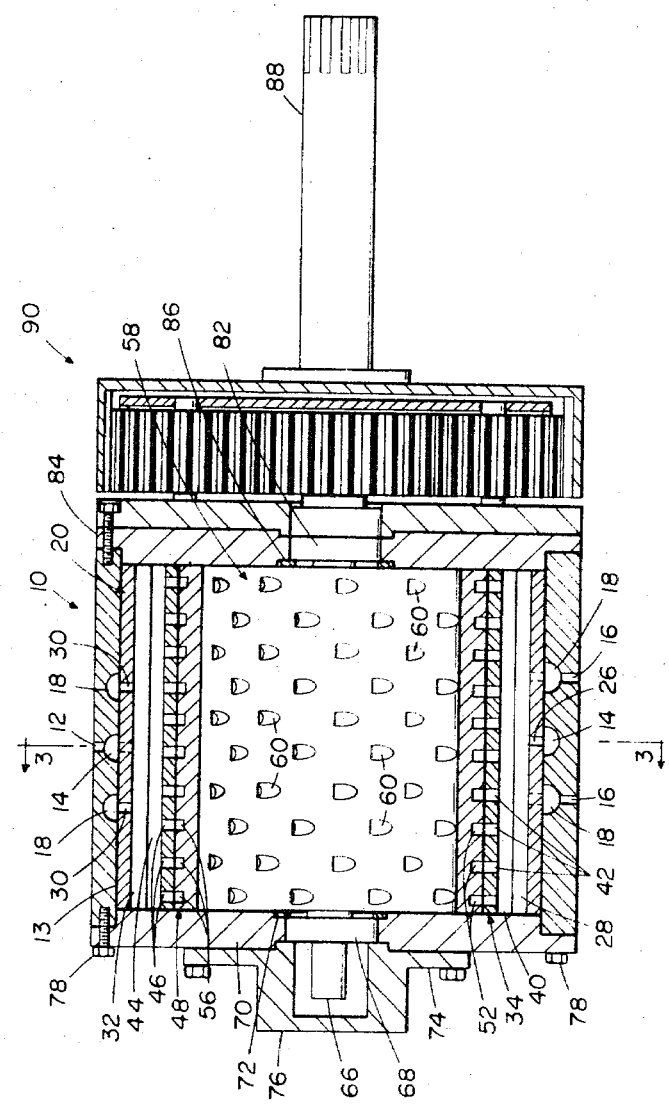
FIG. 2 is a sectional view taken along a diameter of the rotory motor.
Figure 3:
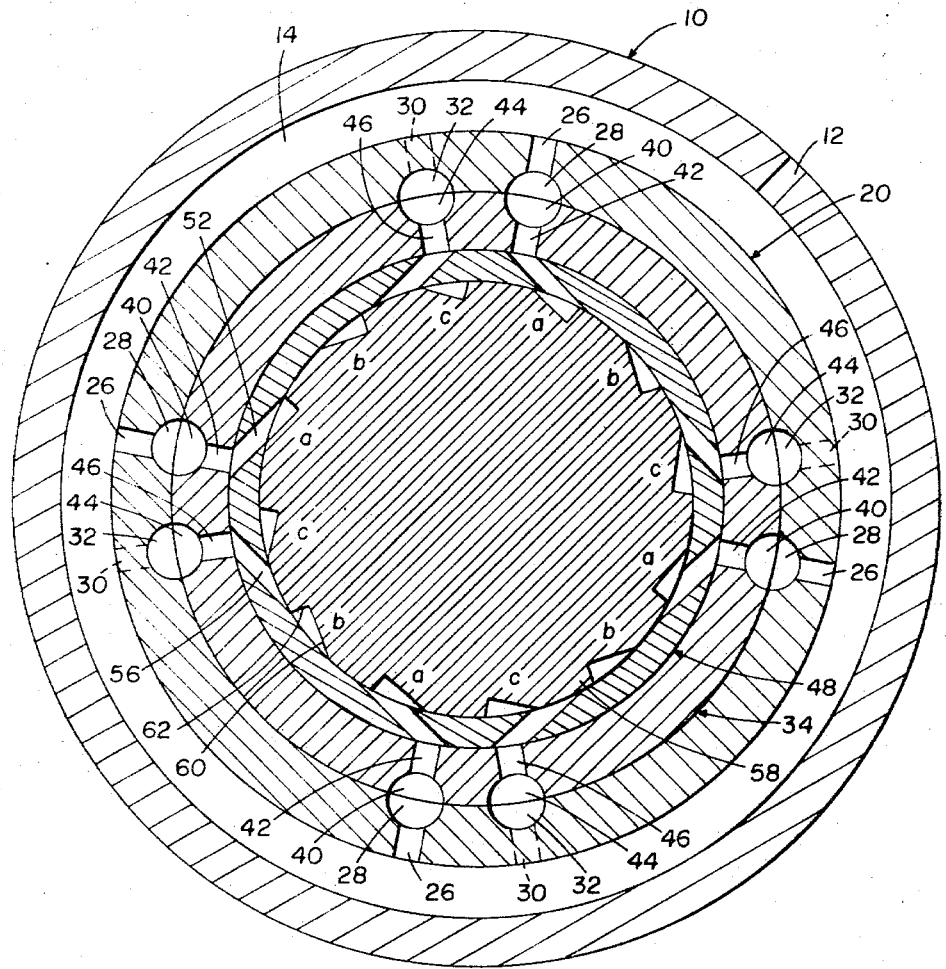
FIG. 3 is a sectional view taken along the line 3 — 3 of FIG. 2.

The rotary motor or turbine of my invention consists of relatively few parts most of which are inside of a housing 10 which is cylindrical in shape and which contains an inlet port 12 communicating with a circumferential groove 14 formed in the inner surface 13 of the housing 10. In addition, housing 10 contains two exhaust ports 16 which communicate with corresponding circumferential grooves 18 also formed in the inner surface 13 of the housing 10. As best seen in FIG. 1, grooves 14 and 18 are axially spaced apart with groove 14 being positioned between the two grooves 18. Preferably, each of the grooves 14 and 18 is of a somewhat semicircular cross sectional shape as best seen in FIG. 2. Received within the housing 10 is a first sleeve indicated generally by the reference numeral 20. Sleeve 20 has an outer surface 22 which engages the inner surface 13 of housing 10 when the two parts are assembled, and the machining of housing 10 and sleeve 20 must be precise and with minimum tolerances so that surface 22 will provide a tight sealing fit against surface 13. Extending radially through the sleeve 20 from its outer surface 22 to its inner surface 24 are a plurality of ports 26 which are axially positioned so as to communicate with the groove 14 of housing 10. In the embodiment shown, there are four such ports 26 evenly spaced circumferentially around the sleeve 20. Each of the ports 26 communicates with an axially extending groove 28 formed along the inner surface 24. As best seen in FIG. 3, each groove 28 is preferably semicircular in cross section and is uniform in dimension along its entire length. Sleeve 20 has two additional sets of ports 30 each of which extends through sleeve 20 from its outer surface 22 to the inner surface 24. Each set of ports 30 corresponds in axial position to one of the grooves 18 in the housing 10. In the embodiment shown, there are four such ports 30 in each set and thus four such ports which communicate with each of the grooves 18 in the housing 10.

Extending axially on the inside surface 24 of sleeve 20 there are in addition to grooves 28 four grooves 32 each of which communicates with one of the ports 30 in each set of four ports. In order to accomplish this communication between ports 30 and grooves 32 ports 30 are circumferentially spaced from the ports 26 with one of the ports 30 in each set being axially aligned with a corresponding port 30 in the other set. Thus, with the sleeve 20 positioned inside of housing 10 and properly aligned with respect thereto, fluid introduced into port 12 of housing 10 will flow through the passageway provided by groove 14 and then through each of the ports 26 into the passageways provided by grooves 28 in the sleeve 20. Similarly, separate and independent paths for the flow of fluid are provided from grooves 32 in sleeve 20 through ports 30 and into the passageways provided by grooves 18 in housing 10 and then through port 16 in housing 10.

In order to continue the unique porting arrangement, there is provided a second sleeve indicated generally by reference numeral 34 which is also a hollow cylinder having an outer surface 36 and an inner surface 38. Formed in the outer surface 36 are four circumferentially spaced-apart axially extending grooves 40 each of which is formed so as to correspond with and be in alignment with a respective groove 28 in the first sleeve 20. The outer diameter of the second sleeve 34 is only slightly less than the inner diameter of the first sleeve 20 so that when sleeve 20 and 34 are assembled, the outer surface 36 of sleeve 34 will sealingly engage the inner surface 24 of sleeve 20. The tolerances on the machining of these surfaces should be such that surface 36 of sleeve 34 and surface 24 of sleeve 20 will provide a metal-to-metal seal. Formed in each of the grooves 40 are a plurality of axially spaced ports 42 each of which extends through sleeve 34 to its inner surface 38. Similarly, axially extending grooves 44 are circumferentially spaced around and formed in the outer surface 36 of sleeve 34. Grooves 44 are positioned so as to correspond to the grooves 32 in the sleeve 20 when that sleeve is assembled with sleeve 34. Grooves 44 each have formed therein a plurality of axially spaced ports 46 which extend through sleeve 34 to its inner surface 38.

To complete the unique porting arrangement of the invention there is provided a third sleeve indicated generally by the reference numeral 48. Sleeve 48 is also a hollow cylinder the outer diameter of which is just slightly less than the inner diameter of sleeve 34 so that when sleeves 34 and 48 are assembled the outer surface 50 of sleeve 48 will engage the inner surface 38 of sleeve 34 and provide a metal-to-metal seal. As best seen in FIG. 1, sleev 48 has four sets of axially spaced ports 52 which extend through sleeve 48 from its outer surface 50 to its inner surface 54. The ports 52 in each set are positioned so as to correspond to and be in alignment with a set of ports 42 in sleeve 34 when the two sleeves are properly assembled in the unit. However, as best seen in FIG. 3, ports 52 do not extend along radial lines like ports 42, but rather extend along chordal lines of the cylindrical shaped sleeve 48. In addition to the four sets of ports 52, sleeve 48 is also provided with four sets of axially spaced ports 56 which are positioned so as to be in alignment with corresponding ports 46 in sleeve 34. Ports 56 also extend from the outer surface 50 to the inner surface 54 of sleeve 48 but do not extend along radial lines. As shown in FIG. 3, respective ones of ports 52 and 56 are in linear alignment along chordal lines. The ports 52 serve as inlet ports and because of their alignment, will direct the pressurized fluid in a direction so as to produce maximum torque on the rotor, which is indicated generally be the reference numeral 58. Rotor 58 is preferably a solid cylinder which has formed in its outer surface a plurality of flutes 60, each of which has a surface 62 against which the pressurized fluid is directed from an inlet port 52 to produce rotation of the rotor 58. As best seen in FIG. 2, the flutes 60 are staggered in 24 axial spaced sets of five flutes each, half the numer of inlet ports 52 in each set of ten. By this arrangement, the number of impulses per revolution of rotor 58 are doubled thus producing a smoother operating motor. From FIG. 3 it should be noted that four sets with five flutes 60 in each set are in alignment with all four sets of inlet ports 52 simultaneously, and at this time (the inlet cycle) none of the flutes 60 are in alignment with the ports 56 which serve as exhaust ports. However, as the rotor 58 continues to rotate, the sets of flutes 60 communicating with inlet ports 56 will move past the inlet ports 52 and the sets of flutes 60 just ahead will come into communication with the exhaust ports 56. During this cycle, (the exhaust cycle), the flutes 60 containing pressurized fluid are in between sets of ports, and they do not reach the exhaust ports 56 until another inlet cycle has occurred during which the sets of five flutes 60 following are in communication with inlet ports 52. This arrangement provides for maximum utilization of the available energy and provides for a continuously operating motor as long as pressurized fluid is supplied to the units.

Rotor 58 is mounted on a central shaft 64 one end of which 66 is seated in a suitable bearing 68 that is retained in place by end plate 70. If desired, a suitable seal 72 can be provided between rotor 58 and the bearing 68. A cover plate 74 completes the enclosure at one end of the unit and serves to retain the bearing 68 in position while providing a cup 76 into which the end 66 of the shaft 64 extends. End cup 76 thus provides an enclosure for a suitable lubricant. Both the end plate 70 and cover plate 74 are held in place by suitable fastening means such as bolts 78 which are threaded into the main housing 10.

The other end 80 of shaft 64 is also supported by a bearing 82 held in place by an end plate 84 with a seal 86 positioned between the bearing 82 and the rotor 58. The end plate 84, similar to end plate 70, is connected by suitable fastening means (not shown) to the other end of the main housing 10. The end 80 of shaft 64 of the rotor 58 provides an output shaft the rotating motion of which can be utilized to drive any suitable device. If desired, end 80 of rotor shaft 64 can be used to power a power output shaft 88 which is connected to shaft 64 through a planetary drive gear arrangement indicated generally by the reference numeral 90. It should be understood that any suitable drive or gear arrangement other than that shown in FIG. 1 can be utilized, the invention residing in the construction and operation of the power unit itself.

In operation, a power unit or turbine constructed according to the invention is connected to a source of pressurized fluid. This might be, for example, a source of a heavy gas such as freon in which the turbine would be part of a closed system recycling the same fluid through a condensing-heating cycle. Of course, the unit could also be driven by steam with a minor modification to adapt the unit for steam. In either event, the pressurized fluid is supplied to the unit through inlet port 12 and distributed around the groove 14 and thence through ports 26 into the axial grooves 28. The pressurized fluid then flows through ports 42 into the inlet ports 52 from where it is simultaneously directed against four sets of five flutes 60 of rotor 58 causing the rotor to turn.

In FIG. 3 there are shown twelve of the 24 sets each set containing five flutes 60. The other 12 sets of flutes 60 are staggered as best seen in FIG. 1.

For purposes of illustration, I have designated in FIG. 3 four of the 12 sets of flutes shown as sets *a*, four more as sets *b* and the other four as sets *c*. The operation described hereafter is with reference to the 12 sets shown, it being understood that simultaneously identical cycles will be going on for the other 12 sets of flutes, each such cycle following the described cycle by 15° of rotation of rotor 58. When rotor 58 is in the position shown in FIG. 3, flutes *a* are in communication with the inlet ports 52, while flutes *b* and *c* are not in communication with any ports. As the rotor 58 continues to move, flutes a will move out of communication with inlet ports 52 and flutes *b* will move into communication with exhaust ports 56. Flutes *c* are now between inlet ports 52 and exhaust ports 56. As flutes *b* complete their exhaust cycle, flutes c will be in their inlet cycle by moving into communication wit inlet ports 52. When flutes *b* have completed their exhaust cycle, fultes *c* will be completing their inlet cycle as flutes a start into their exhaust cycle. With flutes a in the exhaust cycle, flutes *b* will start their inlet cycle upon completion of which cycles, flutes *c* will start their exhaust cycles and flutes a will move into another inlet cycle. At the end of each exhaust cycle, the exhaust fluid will flow through ports 56 and out of ports 46 into the axial grooves 32 and then through ports 30 into the grooves 18 of the main housing 10. The fluid is then exhausted from the unit through the ports 16 where, in a closed system, the fluid would then be condensed, heated and reintroduced into inlet port 12 of the unit.

During the foregoing described cycles when each set of flutes has moved through both an inlet and an exhaust cycle, the rotor 58 will have completed one-fourth of a revolution. Thus, each of the 12 sets of flutes 60, shown in FIG. 3, will go through a complete cycle four times during a single revolution of the rotor 58. Since there are twelve additional sets of flutes 60 simultaneously going through a complete cycle during each one-fourth of a revolution of rotor 58, during a single revolution of rotor 58 there will occur 96 complete cycles with power being produced by five flutes 60 in each cycle. Thus, there will be a total of 480 power impluses during a single revolution of rotor 58. This is largely responsible for the efficiency of the unit and its extremely smooth operation.

From the foregoing description, it will be evident that the inlet fluid flows freely and uniformly from the time it is first introduced through inlet port 12 until it is directed into the flutes 60 of rotor 58. Similarly, the exhaust fluid flows freely from the flutes 60 of rotor 58 until it is exhausted from the ports 16. This smooth uniform flow is provided and distributed by means of the unique porting arrangement formed by proper assembly of the rotor 58 and the three sleeves 20, 34 and 48 into the main housing 10. Each of the component parts of the unit is designed so that it can be easily and accurately machined to close tolerances. Assembly of the unit is obviously easy to accomplish and likewise the unit is easily disassembled when necessary. The unit has a minimum of moving parts, the rotor 58 and the unique arrangement of its flutes 60 relative to the ports of sleeve 48 providing the necessary inlet and exhaust functions at the properly timed intervals. There is, therefore, no necessity for troublesome inlet and exhaust valves with the necessary mechanism to provide proper timing. Thus, the unit of the invention is extremely simple and relatively easy to manufacture and assemble. The invention thus provides an efficient, relatively inexpensive rotary motor with a number of uses particularly in low power requirements. For example, the unit would make an extremely efficient, quiet, and pollution free power unit for a small electrical generating plant. The unit would be relatively maintenance free and because of its relatively low cost could be used in small electrical generating plants for individual residences. The unit, of course, can be made in various sizes and power outputs and, thus, would have a broad range of application.

Although I have described only a preferred embodiment of my invention, it will be evident to those skilled in the art that various revisions and modifications can be made in this specific construction of the embodiment without departing from the spirit and scope of the invention. It is my intention, however, that all such revisions and modifications which are obvious to those skilled in the art will be included within the scope of the following claims.

I claim:

1. A rotary engine powered by pressurized fluid and comprising a housing having outer and inner surfaces and an inlet port and an exhaust port each extending through said housing from said outer surface to said inner surface, a first sleeve positioned within said housing and having a plurality of inlet ports and a plurality of exhaust ports, first means providing communication between the inlet port of said housing and the inlet ports of said first sleeve and between the exhaust port of said housing and the exhaust ports of said first sleeve, a second sleeve positioned within first sleeve and having a plurality of inlet ports and a plurality of exhaust ports, second means providing communication between the inlet ports of said first and second sleeves and between the exhaust ports of said first and second sleeves, a third sleeve positioned within said second sleeve and having a plurality of inlet ports and a plurality of exhaust ports, third means providing communication between inlet ports of said second and third sleeves and between the exhaust ports of said second and third sleeves, a rotor received within said third sleeve, means for rotatably supporting said rotor within said housing, a power output shaft operatively connected to said rotor, and a plurality of flutes spaced around the periphery of said rotor and positioned thereon so as to be in communcation at selected times with selected ones of the inlet and exhaust ports of said third sleeve, as said rotor rotates, the ports of said first, second and third sleeves combined with said first, second and third means providing for distribution of said pressurized fluid onto a plurality of some of said flutes simultaneously and further providing for exhausting of fluid from said flutes.

2. The rotary engine of claim 1 in which said first, second and third sleeves are each hollow cylinders with the respective ports in each sleeve extending from the outer surface to the inner surface thereof.

3. The rotary engine of claim 2 in which both the inlet and exhaust ports of said first sleeve are circumferentially spaced, and said first means provides for flow of said pressurized fluid from said inlet port circumferentially to all of the inlet ports in said first sleeve and further provides independently for flow of said pressurized fluid from the exhaust ports in said first sleeve circumferentially to the exhaust ports in said housing, the inlet ports in said second sleeve being axially spaced apart in circumferentially spaced rows and the exhaust ports in said second sleeve also being axially spaced part in circumferentially spaced rows, said second means providing for flow of said fluid in an axial direction from the inlet ports in said first sleeve to the inlet ports of said second sleeve and further providing for flow of said pressurized fluid in an axial direction from the exhaust ports in second sleeve to the exhaust ports in said first sleeve, the inlet ports in said third sleeve being axially spaced apart in circumferentially spaced rows, the exhaust ports in said third sleeve being axially spaced apart in circumferentially spaced rows, and said third means providing for communication between respective ones of the inlet ports in said third sleeve and the inlet ports in said second sleeve and the exhaust ports in said third sleeve and the exhaust ports in said second sleeve.

4. The rotary engine of claim 3 in which said first means includes a plurality of annular grooves formed on the inner surface of said housing, said annular grooves being axially spaced and positioned relative to the inlet and exhaust ports of said housing and said first sleeve so as to provide communication between the inlet ports and between the exhaust ports, said second means including axial grooves formed in the inner surface of said first sleeve and circumferentially spaced and positioned so as to provide communication between the respective inlet and exhaust ports of said first and second sleeves.

5. The rotary engine of claim 4 in which said flutes are axially spaced apart in circumferentially spaced rows around the periphery of said rotor, the flutes in each row being off-set axially from the flutes in adjacent rows.

6. The rotary engine of claim 5 in which the inlet ports in a row of inlet ports of said third sleeve are in alignment with respective exhaust ports in a row of exhaust ports in said third sleeve, said alignment being along chordal lines, so that pressurized fluid flows from an inlet port to an exhaust port through a flute on said rotor.

7. The rotary engine of claim 6 in which there are three times as many flutes on said rotor as there are inlet ports in said third sleeve, one-half of said flutes being in alignment simultaneously with one-half of said inlet ports in each row, the other half of said inlet ports and flutes being simultaneously in alignment at different times during a complete revolution of said rotor.

8. The rotary engine of claim 7 in which said rotor is a solid cylinder and said flutes are formed in the peripheral surface thereof, each flute being triangular in cross-section.

9. The rotary engine of claim 1 in which each inlet port in said third sleeve is in alignment with a respective one of the exhaust ports in said sleeve, each pair of inlet and exhaust ports being along a chordal line.

10. The rotary engine of claim 9 in which the flutes on said rotor are axially spaced apart in circumferentially spaced rows around the periphery of said rotor, the flutes in a row being off-set axially from the flutes in adjacent rows.

11. The rotary engine of claim 10 in which said rotor is a solid cylinder and the flutes are formed in the peripheral surface thereof, each flute being triangular in cross-section.

* * * * *